UNITED STATES PATENT OFFICE.

RICHARD JOHN CHARD, OF NEW YORK, N. Y.

LUBRICATING COMPOUND.

SPECIFICATION forming part of Letters Patent No. 344,079, dated June 22, 1886.

Application filed January 2, 1885. Renewed May 19, 1886. Serial No. 202,696. (No specimens.)

*To all whom it may concern:*

Be it known that I, RICHARD JOHN CHARD, a citizen of the United States, residing at New York city, in the county of New York and State of New York, have invented certain new and useful Improvements in Lubricating Compounds, of which the following is a specification.

My invention has for its object to provide a new and useful composition of matter to be used for lubricating purposes, one that will be anti-calorific and antiseptic in its character, and which will thoroughly lubricate hot or cold boxes or other parts of machinery in the simplest and best possible manner.

My composition consists of the following ingredients, combined in the proportions stated, viz: French talc, forty parts; tallow, thirty parts; animal oil, ten parts; alkali, seven parts; rubber, six parts; asbestus, seven parts. These ingredients are to be thoroughly mingled together by the application of heat.

The lubricant produced by the above-mentioned composition of matter, mixed in the proportions stated, will stand 900° fire test, is admirably adapted for cooling hot boxes or other heated portions of machinery due to frictional contact, and forms, generally, a most economical, efficient, and thorough lubricant for the various purposes to which it may be adapted.

What I claim, and desire to secure by Letters Patent of the United States, is—

The herein-described composition of matter to be used for lubricating purposes, consisting of French talc, tallow, animal oil, alkali, rubber, and asbestus, in the proportions specified.

In testimony whereof I affix my signature in presence of two witnesses.

RICHARD JOHN CHARD.

Witnesses:
    FREDERICK A. GUILD,
    WM. D. HOWE.